(12) United States Patent
Peng et al.

(10) Patent No.: US 10,863,150 B2
(45) Date of Patent: Dec. 8, 2020

(54) COLOR FILTER ARRAY AND IMAGE SENSOR

(71) Applicant: SmartSens Technology (Shenzhen) Co., Ltd., Guangdong (CN)

(72) Inventors: Mao Peng, Guangdong (CN); Xiaojun Zhang, Guangdong (CN); Wenge Hu, Guangdong (CN)

(73) Assignee: SmartSens Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/487,433

(22) PCT Filed: Feb. 7, 2018

(86) PCT No.: PCT/CN2018/075566
§ 371 (c)(1),
(2) Date: Aug. 20, 2019

(87) PCT Pub. No.: WO2018/153258
PCT Pub. Date: Aug. 30, 2018

(65) Prior Publication Data
US 2019/0379866 A1    Dec. 12, 2019

(30) Foreign Application Priority Data
Feb. 23, 2017    (CN) .......................... 2017 1 0101957

(51) Int. Cl.
*H04N 9/04*    (2006.01)
(52) U.S. Cl.
CPC .............................. *H04N 9/04557* (2018.08)

(58) Field of Classification Search
CPC .... H04N 9/04557; H04N 9/0455; H04N 9/04; H04N 5/2254
See application file for complete search history.

(56) References Cited

U.S. PATENT DOCUMENTS

2003/0197793 A1    10/2003    Mitsunaga et al.
2009/0303359 A1*   12/2009    Otsuka .............. H01L 27/14621
                                                    348/280

(Continued)

FOREIGN PATENT DOCUMENTS

CN    101006731 A    7/2007
CN    206498496 U    9/2017

OTHER PUBLICATIONS

International Search Report of PCT Patent Application No. PCT/CN2018/075566 dated May 7, 2018.

*Primary Examiner* — Mekonnen D Dagnew

(57) ABSTRACT

A color filter array includes color filter units each of which is a square array formed by four square pixels. The first color pixel and the second color pixel are arranged to form a row, the two third color pixels are arranged to form another row, and a row pixel direction of the color filter unit relative to a horizontal direction is inclined by 45° to left or right. The color filter array is an inclined rectangular array, pixels from an intermediate row to a first row or to a last row in a same direction is progressively decreased with a decrement of 1 or 2, and pixels in the first row and the last row is 1 or 2. The application can significantly increase the area of pixels of the unit color filter, and improve the sensitivity of the image sensor without reducing the resolution of the image sensor.

18 Claims, 4 Drawing Sheets

(56) References Cited

U.S. PATENT DOCUMENTS

2015/0109495 A1* 4/2015 Tanaka .............. H01L 27/14621
348/277
2016/0119559 A1* 4/2016 Hsu ................... H04N 5/35563
348/280

* cited by examiner

COLOR FILTER ARRAY AND IMAGE SENSOR

FIELD OF THE INVENTION

The present invention relates to a technology of image sensors, and in particular to a color filter array and an image sensor.

BACKGROUND OF THE INVENTION

With the continuous development of image sensor technology, the resolution requirements of image sensors are getting higher and higher. Therefore, it's necessary to improve the resolution of the image sensor by integrating more color filter pixels on the unit area of the image sensor. Meanwhile, in view of cost considerations and the decreasing volume of various smart terminals such as mobile phones, tablet computers, and digital cameras used in image sensors, it is necessary to continuously reduce the area of color filter pixels integrated on the image sensor to simultaneously satisfy the reduction of the image sensor and the resolution improvement thereof.

The smaller the area of the color filter pixels integrated on the image sensor, the weaker the image sensor's ability to sense light, resulting in reduced sensitivity of the image sensor. Therefore, how to maximize the area of the color filter pixels to improve the sensitivity of the image sensor without reducing the resolution of the image sensor has become an urgent problem to be solved.

SUMMARY OF THE INVENTION

The present invention provides a color filter array and an image sensor, which can maximize the area of the color filter pixel and improve the sensitivity of the image sensor without reducing the resolution of the image sensor.

As an aspect of the present invention, a color filter array includes a plurality of color filter units each of which is a square array formed by an arrangement of four square pixels including a first color pixel, a second color pixel and two third color pixels, wherein the first color pixel and the second color pixel are arranged side by side to form a row of the color filter unit, the two third color pixels are arranged side by side to form another row of the color filter unit, and a row pixel direction of the color filter unit relative to a horizontal direction is inclined by 45° to left or right.

The color filter array is an inclined rectangular array formed by a plurality of pixels arranged periodically according to an arrangement rule of pixels in the color filter units, a number of pixels from an intermediate row to a first row or to a last row in a same direction of the color filter array is progressively decreased with a decrement of 1 or 2, and the number of pixels in the first row and the last row is 1 or 2.

In an embodiment, the number of pixels from the intermediate row to the first row or to the last row in the same direction of the color filter array is progressively decreased with a decrement of 2, and the number of pixels in the first row and the last row is 1 or 2.

In an embodiment, the number of pixels in the first row and the last row inclined by 45° to the left with respect to the horizontal direction is identical and equal to 1, and the number of pixels in the first row and the last row inclined by 45° to the right with respect to the horizontal direction is identical and equal to 2.

In an embodiment, the number of pixels in the first row and the last row is identical.

In an embodiment, the number of pixels in the first row inclined by 45° to the left with respect to the horizontal direction is 2 and the number of pixels in the last row is 1, and the number of pixels in the first row inclined by 45° to the right with respect to the horizontal direction is 1 and the number of pixels in the last row is 2; or, the number of pixels in the first row inclined by 45° to the left with respect to the horizontal direction is 1 and the number of pixels in the last row is 2, and the number of pixels in the first row inclined by 45° to the right with respect to the horizontal direction is 2 and the number of pixels in the last row is 1.

In an embodiment, the first color pixel is a red pixel, the second color pixel is a blue pixel and the third color pixels are green pixels.

In an embodiment, the first color pixel is a blue pixel, the second color pixel is a red pixel and the third color pixels are green pixels.

In an embodiment, the first color pixel is a red pixel, the second color pixel is a blue pixel and the third color pixels are white pixels.

In an embodiment, the first color pixel is a blue pixel, the second color pixel is a red pixel and the third color pixels are white pixels.

As another aspect of the present invention, an image sensor includes the above color filter array.

In the embodiment of the present application, by changing the arrangement of pixels in the color filter unit based on the existing Bayer pattern arrangement, two pixels originally arranged along the diagonal apart are arranged side by side, and a color filter array is formed by multiple color filter units which are tilted to the left or the right by 45° with respect to the horizontal direction, which can maximize the area of the pixels of the unit color filter and improve the sensitivity of the image sensor without reducing the resolution of the image sensor.

BRIEF DESCRIPTION OF THE DRAWINGS

In order to more clearly illustrate the technical solutions in the embodiments of the present invention, the drawings used in the description of the embodiments will be briefly described below. Obviously, the drawings in the following description are some embodiments of the present solution, those skilled in the art can also obtain other drawings based on these drawings without any creative effort.

DETAILED DESCRIPTION OF ILLUSTRATED EMBODIMENTS

In order to enable a person skilled in the art to better understand the solution, the technical solution in the embodiment of the present solution will be clearly described below with reference to the accompanying drawings in the embodiments of the present embodiment. It is obvious that the described embodiments are a part of embodiments, not all of the embodiments. Based on the embodiments, all other embodiments obtained by those skilled in the art without creative efforts shall fall within the scope of protection of the present solution.

The term "comprising" and variations of the terms in the specification and claims of the present invention and the above-described drawings are intended to cover non-exclusive inclusions. Moreover, the terms "first" and "second" and the like are used to distinguish different objects and are not intended to describe a particular order.

Figure 1:
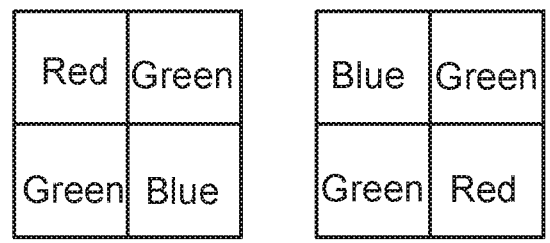
FIG. 1 is a schematic structural view of a color filter unit based on a Bayer pattern arrangement in the prior art.

As shown in FIG. 1, a conventional color filter unit based on a Bayer pattern arrangement is a square array formed by an arrangement of four square pixels including a red pixel, a blue pixel and two green pixels. Specifically, the two green pixels are spaced apart diagonally, and the color filter unit has a row pixel direction along a horizontal direction. In FIG. 1, the left diagram indicates the case where two green pixels are spaced apart along the left diagonal line, and the right diagram indicates the case where two green pixels are spaced apart along the right diagonal line.

Figure 2:
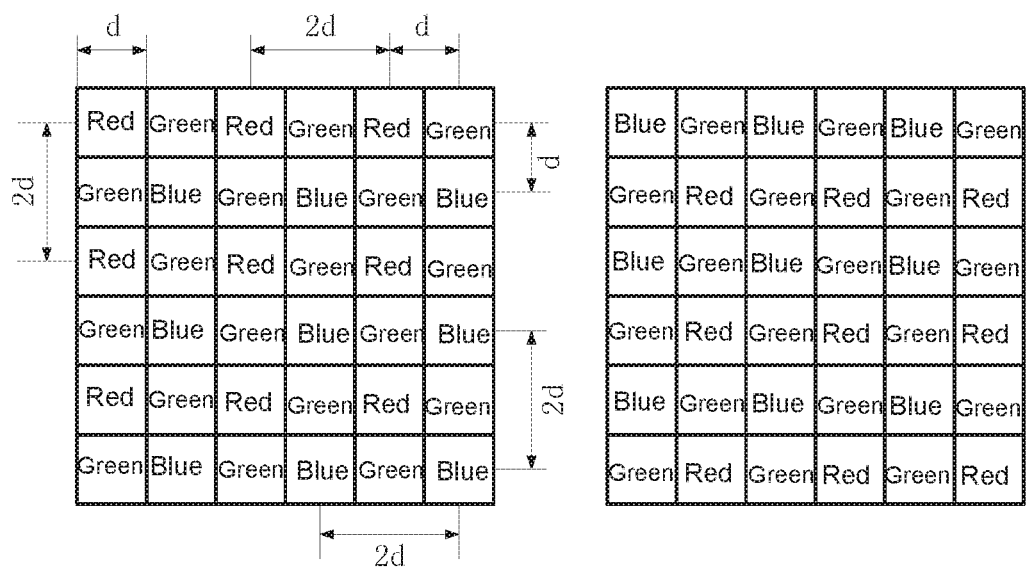
FIG. 2 is a schematic structural view of a color filter array formed by a plurality of color filter units of FIG. 1 in the prior art.

As shown in FIG. 2, a conventional color filter array formed by a plurality of color filter units of FIG. 1 is a square array. Exemplarily, two square arrays with a pixel size of 6×6 are shown, the left diagram shows a color filter array formed by multiple color filter units in the left one of FIG. 1, and the right diagram shows another color filter array formed by multiple color filter units in the right one of FIG. 1.

Specifically, supposing the side length of a single pixel in the color filter array shown in the left or right diagram in FIG. 2 is d, then the spatial resolution of the red or blue pixel in the color filter array shown in FIG. 2 is 2d, and the spatial resolution of the green pixel is d.

Figure 3:
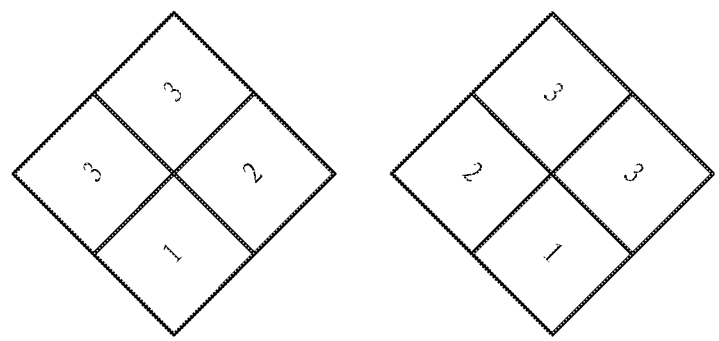
FIG. 3 is a schematic structural view of an improved color filter unit according to one embodiment of the present invention.

As illustrated in FIG. 3, an improved color filter unit according to one embodiment of the present invention is provided, which is improved based on the conventional color filter unit. In this embodiment, the color filter unit is a square array formed by an arrangement of four square pixels including a first color pixel, a second color pixel and two third color pixels. The first color pixel and the second color pixel are arranged side by side to form a row of the color filter unit, and the two third color pixels are arranged side by side to form another row of the color filter unit, and the row pixel direction of the color filter unit is inclined to left or right by 45° relative to the horizontal direction.

In FIG. 3, the left diagram shows a color filter unit with the row pixel direction inclined to left by 45° relative to the horizontal direction, and the right diagram shows another color filter unit with the row pixel direction inclined to right by 45° relative to the horizontal direction. The numeral reference "1" denotes a first color pixel, "2" denotes a second color pixel, and "3" denotes a third color pixel.

In an embodiment of the present invention, the first color pixel can be a red pixel, the second color pixel can be a blue pixel, and the third color pixel can be a green pixel or a white pixel.

In another embodiment of the present invention, the first color pixel can be a blue pixel, the second color pixel can be a red pixel, and the third color pixel can be a green pixel or a white pixel.

A color filter array according to one embodiment of the present invention is an inclined rectangular array formed by a plurality of pixels arranged periodically according to an arrangement rule of pixels in the color filter units shown in the left diagram or right diagram of FIG. 3. The number of pixels from an intermediate row to a first row or to a last row in a same direction of the color filter array is progressively decreased with a decrement of 1 or 2, and the number of pixels in the first row and the last row are 1 or 2.

A color filter array according to one embodiment of the present invention is an inclined rectangular array formed by a plurality of pixels arranged periodically according to an arrangement rule of pixels in the color filter units shown in the left diagram or right diagram of FIG. 3. The number of pixels from an intermediate row to a first row or to a last row in a same direction of the color filter array is progressively decreased with a decrement of 2, and the number of pixels in the first row and the last row are the identical, which are equal to 1 or 2.

Figure 4:
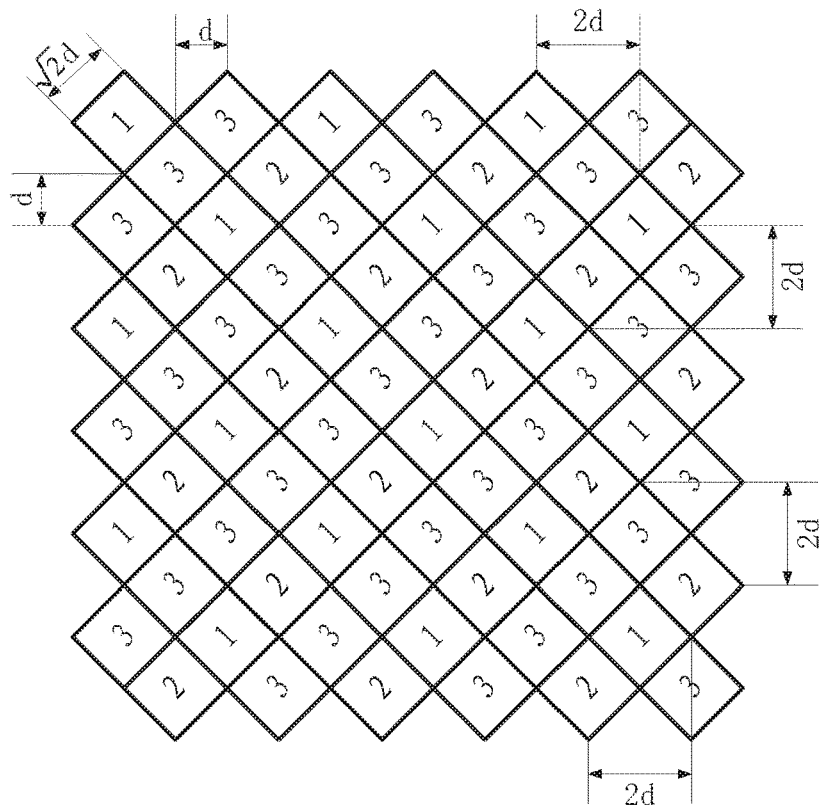
FIG. 4 is a schematic structural view of a color filter array according to one embodiment of the present invention.

Exemplarily, FIG. 4 illustrates an inclined array having a pixel size of 72, which is periodically arranged by 72 pixels in accordance with the arrangement rule of the color filter units shown in the left diagram of FIG. 3. In actual applications, the color filter array shown in FIG. 4 can be obtained by cutting a pattern with 24 color filter units arranged as shown in the left diagram of FIG. 3. Specifically, in FIG. 4, the number of pixels in the first row and the last row inclined by 45° to the left with respect to the horizontal direction is identical, which is equal to 1, and the number of pixels in the first row and the last row inclined by 45° to the right with respect to the horizontal direction is identical, which is equal to 2.

Figure 5:
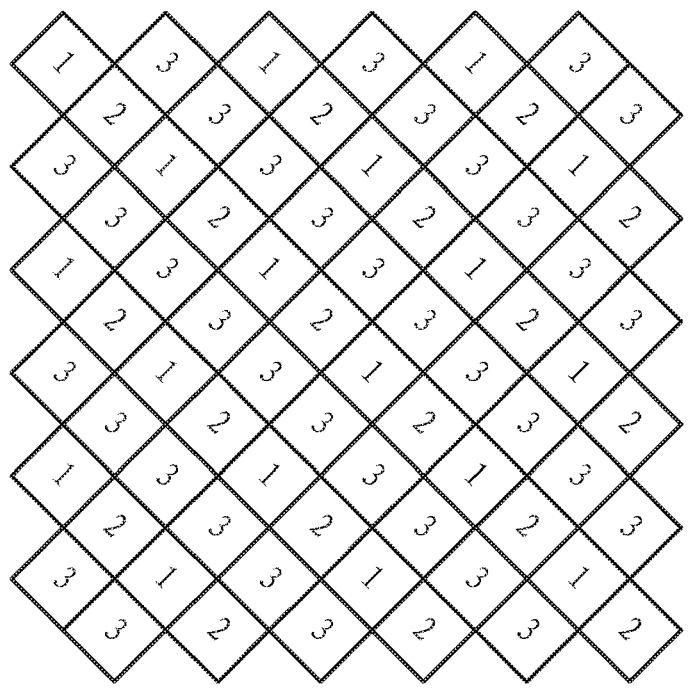
FIG. 5 is a schematic structural view of a color filter array according to one embodiment of the present invention.

Exemplarily, FIG. 5 illustrates an inclined array having a pixel size of 72, which is periodically arranged by 72 pixels in accordance with the arrangement rule of the color filter units shown in the right diagram of FIG. 3. In actual applications, the color filter array shown in FIG. 5 can be obtained by cutting a pattern with 24 color filter units arranged as shown in the right diagram of FIG. 3. Specifically, in FIG. 5, the number of pixels in the first row and the last row inclined by 45° to the left with respect to the horizontal direction is identical, which is equal to 1, and the number of pixels in the first row and the last row inclined by 45° to the right with respect to the horizontal direction is identical, which is equal to 2.

Supposing the side length of a single pixel in the color filter array shown in FIG. 4 or FIG. 5 is $2^{1/2}d$, then the spatial resolution of the first color pixel or the second color pixel is 2d, and the spatial resolution of the third color pixel is d.

Figure 6:
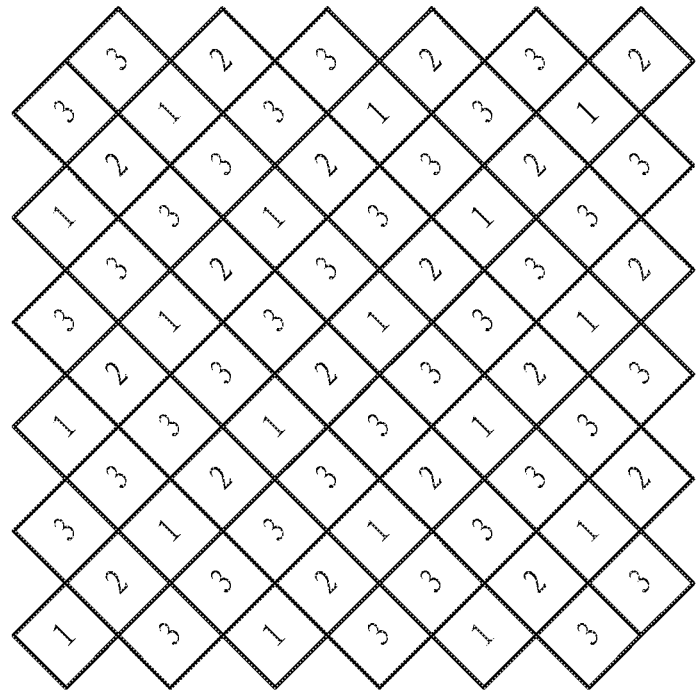
FIG. 6 is a schematic structural view of a color filter array according to one embodiment of the present invention.

Exemplarily, FIG. 6 illustrates an inclined array having a pixel size of 72, which is periodically arranged by 72 pixels in accordance with the arrangement rule of the color filter units shown in the left diagram of FIG. 3. In actual applications, the color filter array shown in FIG. 6 can be obtained by cutting a pattern with 24 color filter units arranged as shown in the left diagram of FIG. 3. Specifically, in FIG. 6, the number of pixels in the first row and the last row inclined by 45° to the left with respect to the horizontal direction is identical, which is equal to 2, and the number of pixels in the first row and the last row inclined by 45° to the right with respect to the horizontal direction is identical, which is equal to 1.

Supposing the side length of a single pixel in the color filter array shown in FIG. 6 is $2^{1/2}d$, then the spatial resolution of the first color pixel or the second color pixel is 2d, and the spatial resolution of the third color pixel is d.

Compared with the parameters of the color filter array in the prior art, it can be seen that, in the case that the pixel resolution is the same, the side length of a single pixel in the color filter array provided by the embodiment of the present application is larger, which increases the area of the pixel of a unit color filter without changing the spatial resolution.

In a specific application, the color filter array provided by the embodiment of the present application can be cut into an arbitrary shape according to actual needs, as long as the periodic arrangement rule of the pixels is not changed.

In a specific application, the color filter array formed by periodically arranging a plurality of pixels according to the arrangement rule of pixels in the color filter unit may also have various arrangement manners, as long as the intermediate rows in the same direction of the color filter array are satisfied. The number of pixels in the first row and the last row may be successively decreased and the decrement of pixels is 1 or 2, and the number of pixels in the first row and the last row may be 1 or 2.

An embodiment of the present application provides a color filter array which is an inclined rectangle which is periodically arranged by a plurality of pixels according to the arrangement rule of pixels in the color filter unit shown in the left diagram or the right diagram of FIG. 3. In the array, the number of pixels in the intermediate row to the first row and the last row in the same direction of the color filter array is progressively decreased and the decrement of pixels is 1 or 2, and the number of pixels of the first row and the last row is the same.

Figure 7:
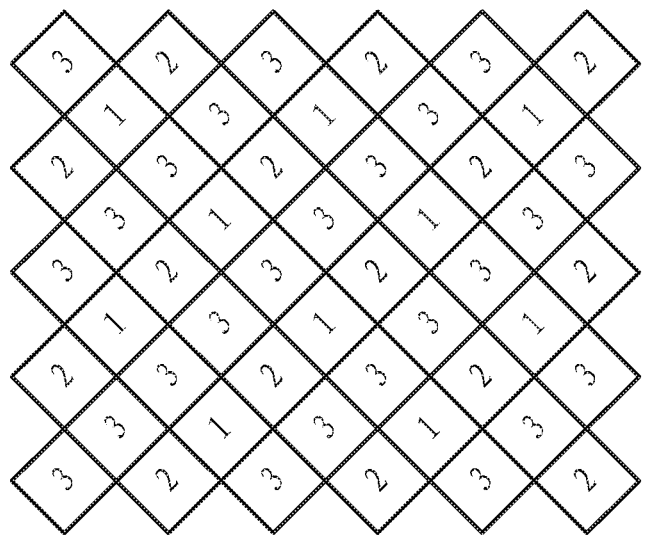
FIG. 7 is a schematic structural view of a color filter array according to one embodiment of the present invention.

Exemplarily, FIG. 7 illustrates an inclined array having a pixel size of 50, which is periodically arranged by 50 pixels in accordance with the arrangement rule of the color filter units shown in the left diagram of FIG. 3. In actual applications, the color filter array shown in FIG. 7 can be obtained by cutting a pattern with 17 color filter units arranged as shown in the left diagram of FIG. 3. Specifically, in FIG. 7, the number of pixels in the first row and the last row in the same direction is identical, which is equal to 1.

Figure 8:
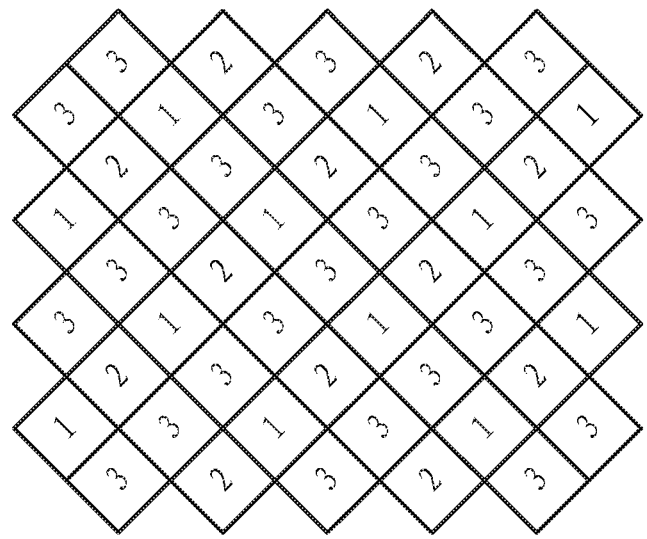
FIG. 8 is a schematic structural view of a color filter array according to one embodiment of the present invention.

Exemplarily, FIG. 8 illustrates an inclined array having a pixel size of 50, which is periodically arranged by 50 pixels in accordance with the arrangement rule of the color filter units shown in the left diagram of FIG. 3. In actual applications, the color filter array shown in FIG. 8 can be obtained by cutting a pattern with 15 color filter units arranged as shown in the left diagram of FIG. 3. Specifically, in FIG. 8, the number of pixels in the first row and the last row in the same direction is identical, which is equal to 1.

An embodiment of the present application provides a color filter array which is an inclined rectangular array which is periodically arranged by a plurality of pixels according to the arrangement rule of pixels in the color filter unit shown in the left or right diagram of FIG. 3. The number of pixels in the intermediate row to the first row and the last row in the same direction of the color filter array is progressively decreased and the decrement is 1 or 2, the number of pixels in the first row inclined by 45° to the left with respect to the horizontal direction is 2 and the number of pixels in the last row is 1, and the number of pixels in the first row inclined by 45° to the right with respect to the horizontal direction is 1 and the number of pixels in the last row is 2. Or the number of pixels in the first row inclined by 45° to the left with respect to the horizontal direction is 1 and the number of pixels in the last row is 2, and the number of pixels in the first row inclined by 45° to the right with respect to the horizontal direction is 2 and the number of pixels in the last row is 1.

Figure 9:
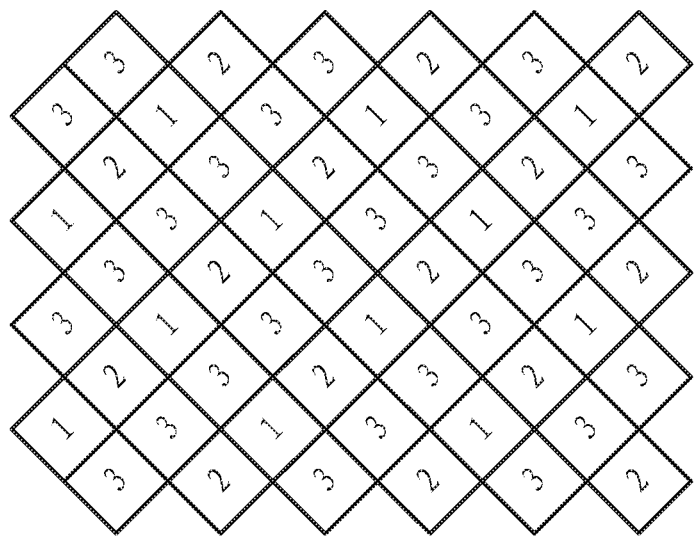
FIG. 9 is a schematic structural view of a color filter array according to one embodiment of the present invention.

Exemplarily, FIG. 9 illustrates an inclined array having a pixel size of 54, which is periodically arranged by 54 pixels in accordance with the arrangement rule of the color filter units shown in the left diagram of FIG. 3. In actual applications, the color filter array shown in FIG. 9 can be obtained by cutting a pattern with 17 color filter units arranged as shown in the left diagram of FIG. 3. Specifically, in FIG. 9, the number of pixels of the first row inclined by 45° to the left with respect to the horizontal direction is 2, and the number of pixels of the last row is 1; while the number of pixels of the first row inclined by 45° to the right with respect to the horizontal direction is 2, and the number of pixels of the last row is 2.

All embodiments in the present disclosure should comply with the following rules:

The total pixels of the color filter array are larger than or equal to 8;

The intermediate rows are defined as follows:

If the total rows of the color filter array in a direction inclined by 45° to the left or right with respect to the horizontal direction is M, wherein M is a positive integer; when M is an even, both the M/2th row and M/(2+1)th row are the intermediate rows, the number of pixels from the M/2th row to the first row is successively decremented and the number of decrement is 1 or 2, and the number of pixels from the M/(2+1)th row to the last row is successively decremented and the number of decrement is 1 or 2;

When M is an odd, the (M+1)/2th row is the intermediate row, and the number of pixels from the (M+1)/2th row to the first row or to the last row is successively decremented and the number of decrement is 1 or 2.

The present invention further provides an image sensor including the above-described color filter array consisting of a periodic arrangement of color filter elements tilted by 45° to the left or right with respect to the horizontal direction. In the embodiment, by providing an image sensor including the color filter array, the area of pixels of the unit color filter can be maximized without reducing the resolution of the image sensor, thereby improving the sensitivity of the image sensor.

One of ordinary skilled in the art can understand that all or part of the process of implementing the foregoing embodiments can be completed by a computer program to instruct related hardware, and the program can be stored in a computer readable storage medium. When executed, the flow of an embodiment of the methods as described above may be included. The storage medium may be a magnetic disk, an optical disk, a read-only memory (ROM), or a random access memory (RAM).

While the disclosure has been described in connection with what are presently considered to be the most practical and preferable embodiments, it is to be understood that the disclosure is not to be limited to the disclosed embodiments, but on the contrary, is intended to cover various modifications and equivalent arrangements included within the spirit and scope of the disclosure.

What is claimed is:

1. A color filter array, comprising a plurality of color filter units each of which is a square array formed by an arrangement of four square pixels including a first color pixel, a second color pixel and two third color pixels, the first color pixel and the second color pixel being arranged side by side to form a row of the color filter unit, the two third color pixels being arranged side by side to form another row of the color filter unit, and a row pixel direction of the color filter unit relative to a horizontal direction being inclined by 45° to left or right;

the color filter array being an inclined rectangular array formed by a plurality of pixels arranged periodically according to an arrangement rule of pixels in the color filter units, a number of pixels from an intermediate row to a first row or to a last row in a same direction of the color filter array being progressively decreased with a decrement of 1 or 2, and the number of pixels in the first row and the last row being 1 or 2;

wherein the intermediate rows are defined as follows:

if the total rows of the color filter array in a direction inclined by 45° to the left or right with respect to the horizontal direction is M, wherein M is a positive integer; when M is an even, both the M/2th row and M/(2+1)th row are the intermediate rows, the number of pixels from the M/2th row to the first row is successively decremented and the number of decrement is 1 or 2, and the number of pixels from the M/(2+1)th row to the last row is successively decremented and the number of decrement is 1 or 2;

when M is an odd, the (M+1)/2th row is the intermediate row, and the number of pixels from the (M+1)/2th row to the first row or to the last row is successively decremented and the number of decrement is 1 or 2.

2. The color filter array according to claim 1, wherein the number of pixels from the intermediate row to the first row or to the last row in the same direction of the color filter array is progressively decreased with a decrement of 2, and the number of pixels in the first row and the last row is 1 or 2.

3. The color filter array according to claim 2, wherein the number of pixels in the first row and the last row inclined by 45° to the left with respect to the horizontal direction is identical and equal to 1, and the number of pixels in the first row and the last row inclined by 45° to the right with respect to the horizontal direction is identical and equal to 2.

4. The color filter array according to claim 1, wherein the number of pixels in the first row and the last row is identical.

5. The color filter array according to claim 1, wherein the number of pixels in the first row inclined by 45° to the left with respect to the horizontal direction is 2 and the number of pixels in the last row is 1, and the number of pixels in the first row inclined by 45° to the right with respect to the horizontal direction is 1 and the number of pixels in the last row is 2;

or, the number of pixels in the first row inclined by 45° to the left with respect to the horizontal direction is 1 and the number of pixels in the last row is 2, and the number of pixels in the first row inclined by 45° to the right with respect to the horizontal direction is 2 and the number of pixels in the last row is 1.

6. The color filter array according to claim 1, wherein the first color pixel is a red pixel, the second color pixel is a blue pixel and the third color pixels are green pixels.

7. The color filter array according to claim 1, wherein the first color pixel is a blue pixel, the second color pixel is a red pixel and the third color pixels are green pixels.

8. The color filter array according to claim 1, wherein the first color pixel is a red pixel, the second color pixel is a blue pixel and the third color pixels are white pixels.

9. The color filter array according to claim 1, wherein the first color pixel is a blue pixel, the second color pixel is a red pixel and the third color pixels are white pixels.

10. An image sensor, comprising the color filter array according to claim 1.

11. The image sensor according to claim 10, wherein the number of pixels from the intermediate row to the first row or to the last row in the same direction of the color filter array is progressively decreased with a decrement of 2, and the number of pixels in the first row and the last row is 1 or 2.

12. The image sensor according to claim 10, wherein the number of pixels in the first row and the last row inclined by 45° to the left with respect to the horizontal direction is identical and equal to 1, and the number of pixels in the first row and the last row inclined by 45° to the right with respect to the horizontal direction is identical and equal to 2.

13. The image sensor according to claim 10, wherein the number of pixels in the first row and the last row is identical.

14. The image sensor according to claim 10, wherein the number of pixels in the first row inclined by 45° to the left with respect to the horizontal direction is 2 and the number of pixels in the last row is 1, and the number of pixels in the first row inclined by 45° to the right with respect to the horizontal direction is 1 and the number of pixels in the last row is 2;

or, the number of pixels in the first row inclined by 45° to the left with respect to the horizontal direction is 1 and the number of pixels in the last row is 2, and the number of pixels in the first row inclined by 45° to the right with respect to the horizontal direction is 2 and the number of pixels in the last row is 1.

15. The image sensor according to claim 10, wherein the first color pixel is a red pixel, the second color pixel is a blue pixel and the third color pixels are green pixels.

16. The image sensor according to claim 10, wherein the first color pixel is a blue pixel, the second color pixel is a red pixel and the third color pixels are green pixels.

17. The image sensor according to claim 10, wherein the first color pixel is a red pixel, the second color pixel is a blue pixel and the third color pixels are white pixels.

18. The image sensor according to claim 10, wherein the first color pixel is a blue pixel, the second color pixel is a red pixel and the third color pixels are white pixels.

* * * * *